(12) United States Patent
Anderson et al.

(10) Patent No.: US 8,510,988 B2
(45) Date of Patent: Aug. 20, 2013

(54) SELF-WATERING PLANT CONTAINER WITH ROOT PRUNING AERATION APERTURES AND EXTERIOR WATER LEVEL INDICATOR

(76) Inventors: George Anderson, Portland, OR (US); Ralph Rhoads, Bellingham, WA (US)

(*) Notice: Subject to any disclaimer, the term of this patent is extended or adjusted under 35 U.S.C. 154(b) by 186 days.

(21) Appl. No.: 13/071,976

(22) Filed: Mar. 25, 2011

(65) Prior Publication Data
US 2012/0240466 A1    Sep. 27, 2012

(51) Int. Cl.
*A01G 27/02* (2006.01)
*A01G 27/06* (2006.01)

(52) U.S. Cl.
USPC .................................. 47/80; 47/81

(58) Field of Classification Search
USPC ............................. 47/80, 81
See application file for complete search history.

(56) References Cited

U.S. PATENT DOCUMENTS

| | | | |
|---|---|---|---|
| 4,216,623 A * | 8/1980 | Silver | 47/80 |
| 4,739,581 A * | 4/1988 | Jarvis | 47/71 |
| 5,181,951 A * | 1/1993 | Cosse, Jr. | 71/64.11 |
| 6,070,360 A * | 6/2000 | Liao et al. | 47/80 |
| 7,000,351 B2 * | 2/2006 | Baumann | 47/80 |
| 7,730,666 B2 * | 6/2010 | Spray | 47/79 |

* cited by examiner

*Primary Examiner* — Son T Nguyen
*Assistant Examiner* — Kathleen Iwasaki
(74) *Attorney, Agent, or Firm* — Craig A. Simmermon

(57) ABSTRACT

Self-watering plant container includes a container used to hold a living plant and soil and a container to hold a pool of water or nutrient solution underneath the plant/soil container where the water may be absorbed by the living plant through a permeable bottom in the plant/soil container. Self-watering plant container includes an airspace layer located between the bottom of the plant/soil container and the top of the water or nutrient solution pool in order to prevent excessive moisture or water from being absorbed into the plant/soil container, thereby preventing root rot. Self-watering plant container achieves this partly by special funnel shaped root-pruning aeration apertures in the bottom of its plant/soil container that allow very small roots and root hairs to grow through the bottom of plant/soil container and into the water reservoir below, while forcing larger roots back into the plant/soil container, and also allowing for aeration of the plant/soil container.

1 Claim, 9 Drawing Sheets

SELF-WATERING PLANT CONTAINER WITH ROOT PRUNING AERATION APERTURES AND EXTERIOR WATER LEVEL INDICATOR

BACKGROUND OF THE INVENTION

1. Field of the Invention

Many times there is a need to grow fruits, vegetables, or flowers in pots or containers as opposed to growing them in the ground. This need may arise from a lack of ground space available to the plant grower in which to grow plants. Lack of ground space may be an issue for those people who live in apartments, condominiums, townhouses, urban areas, row houses, high-density housing areas, or other dwellings that do not have yards or ground space included with the property.

Typically, the fruits, vegetables, and flowers harvested from plants grown in containers are smaller and/or of lesser quality or taste than those produced from plants grown in the ground. This is primarily due to the availability of more water and nutrients in the ground as opposed to those available to plants growing in plant containers. The ground tends to be naturally wet or moist from rain, water table, or other natural source, with plenty of nutrients, at least much more so than a typical plant growing in a typical plant container. Plant containers are not in contact with the ground to receive benefit from the water and nutrients there. Plant containers essentially must receive water and nutrients from the plant grower, who typically cannot deliver such in the optimum quantities and methods as nature does. Even when a plant container is exposed to rainwater, the rainwater tends to wash nutrients out of the soil, as the rainwater flushes in through the top of the container and out through the bottom, thereby depleting the soil in the container of nutrients. Thus, typically, conditions are better for a plant in the ground rather than in a plant container, thereby leading to better harvests from plants growing in the ground.

One particular concern regarding growing plants in containers is the plant disease commonly called "root rot". This disease arises from too much moisture in the root system of a plant. What typically occurs is the plant grower over-waters the plant, unknowingly, thinking that he is helping increase the harvest. However, in actuality, the excess water typically cultures molds in the root system, where the molds feed on the root system or otherwise kill the root system thereby killing the plant. This excess moisture condition typically does not occur in the ground because excess water or moisture in a plant's root system typically drains by percolating down into the soil layers in the ground below the plant roots. On the other hand, with a plant container, there is nowhere for the excess moisture to drain because a plaint container's bottom is typically a water barrier. There may be drainage holes in the bottom of the plant container, however, the plant grower typically places the plant container in a saucer. Typically, drainage water fills up the saucer to be reabsorbed back into the plant container later, thereby preventing any real drainage of excess water or moisture. Even when there is actual drainage, water drains by flowing over the saucer brim, so the soil remains wet as long as the saucer remains full of water. The plant grower typically keeps the saucer full of water in order to prevent the plant from drying out, however, in actuality it frequently harms the plant by causing root rot.

On the other hand, root rot may be prevented by allowing the saucer and soil to dry out for a few hours or more at the end of each watering cycle, by not refilling the saucer until after the soil has dried out for a while. This allows the root system of the plant to dry out for a time period, which kills the mold. The killing of the mold prevents the root rot. A dry cycle, so to speak, in the watering cycle of the plant, will prevent root rot.

However, when the dry cycle occurs, the plant is losing valuable water and nutrient absorption time because the root system is allowed to dry out. In effect, every second of dry-out time required to prevent root rot detracts from the quality and quantity of the harvest. This is because plants use water in photosynthesis. Photosynthesis is the process used by plants to grow, i.e. to increase mass and form new roots, trunks, branches, stems, leaves, fruits, vegetables, flowers, etc. In the photosynthesis process, photons from a light source shining on a plant leaf break apart water molecules absorbed by the plant through the roots, thereby freeing hydrogen atoms from the water. The hydrogen atoms then combine with carbon from carbon dioxide absorbed by the plant from the air to form carbohydrate molecules or glucose. Glucose is then moved to different areas of the plant and used by the plant to form new plant tissue, including fruits, vegetables, and flowers. Thus, in short, plants combine light, water, and air to produce the fruits, vegetables, and flowers. Further, in order for a root to stay alive and to absorb water and nutrients efficiently into the plant's system, the root must be kept moist. However, when the root system is allowed to dry out, for instance, in order to prevent root-rot, the roots cannot absorb water and nutrients at all and moreover the root system faces a threat of dying if left to dry out for too long. When a plant root is dry, it is not absorbing water and nutrients during that time and additionally after the root becomes wet or moist again more time is required for the root to be capable of absorption again. Therefore, the dry time to prevent root rot wastes valuable photosynthesis time, which naturally detracts from the harvest of the plant.

2. Description of Related Art

To prevent excess moisture causing root rot in plant containers, some containers are constructed to provide an air layer or air space between the water level in the saucer or water pan and the bottom of the soil or growing media with root system, thereby suspending the root system above the water level, keeping the root system more dry, and preventing it from contracting root rot. By the same token, however, the root system should not be kept too dry because this detracts from optimum water and nutrient absorption of the plant, thereby detracting from the optimum harvest from the plant. To combat this, while still preventing root rot, some containers are designed with wicking chambers. Wicking chambers are smaller areas of the soil media that actually do extend down below the water level in the saucer so that soil in the wicking chamber may absorb or wick water up and carry it into the main soil media chamber, which is located above the airspace and above the water level in the saucer. The wicking chamber must be designed in such a way so as to absorb or wick enough water and nutrients into the main soil chamber to render rapid growth of the plant along with rapid growth of its fruits, vegetables, or flowers, but not too much as to cause root rot which typically leads to total failure of the plant. There are several devices in the prior art that have this air layer along with wicking chambers to function in such a way.

However, nothing in the prior art includes a separate insert member that supports the soil or growing media above a water reservoir where the insert member has specially shaped root-pruning aeration apertures that allow the plant's root system to stay moist so that the roots may continuously absorb water and nutrients throughout the day while also preventing the root system from becoming too wet to allow root rot to develop. Root-pruning aeration apertures accomplish this in part by forcing large roots back into the soil chamber and not allowing them to pass through the insert and into the water reservoir, while also allowing only tiny roots or root hairs to pass through the insert and into the water reservoir. This division is key to preventing the over-wetting of the soil. Root-pruning aeration apertures also allow air to permeate through them thereby aerating the root system, but not allowing too much air to permeate so as to cause the roots to dry out, thereby slowing or stopping the absorption of water and nutrients by the roots of the plant. There are other special aspects of the insert member that are patentable.

BRIEF SUMMARY OF THE INVENTION

Self-watering plant container includes a container used to hold a living plant and soil or growing medium in which to grow the plant. Self-watering plant container also includes a container to hold a pool of water or nutrient solution underneath the plant/soil container where the water may be absorbed by the living plant through a permeable bottom in the plant/soil container. Self-watering plant container also includes an airspace layer located between the bottom of the plant/soil container and the top of the water or nutrient solution pool in order to prevent excessive moisture or water from being absorbed into the plant's soil.

Self-watering plant container achieves this partly by specially shaped root-pruning aeration apertures in the bottom of its plant/soil container that allow very small roots and root hairs to grow through the bottom of plant/soil container and into the water reservoir below, while preventing other roots from doing this, while also allowing for aeration of the plant/soil container. Self-watering plant container uses these very small roots and root hairs in order to absorb water from the reservoir.

Self-watering plant container also includes a wicking chamber that is a smaller chamber of soil or growing medium that extends down below the bottom of plant/soil container and into the water reservoir. The wicking chamber functions to absorb water or nutrients from the reservoir and to carry the water/nutrients upwards into the main soil chamber.

It is an aspect self-watering plant container to hold one or more living plants along with at least twenty-five pounds of soil or growing medium. It is an aspect self-watering plant container that, no matter how often the container is watered by the plant grower, it will not develop root rot as a result. It is an aspect self-watering plant container that the water level of its reservoir may be inspected from a distance or by walking by it. It is an aspect self-watering plant container to have an exposed water reservoir so that the water reservoir may be refilled from the exterior by pouring water into the exposed reservoir. It is an aspect self-watering plant container to hold up to the elements and to not deteriorate and remain functioning and sturdy after may years of exposure to outside weather.

DEFINITION LIST

Figure 1:
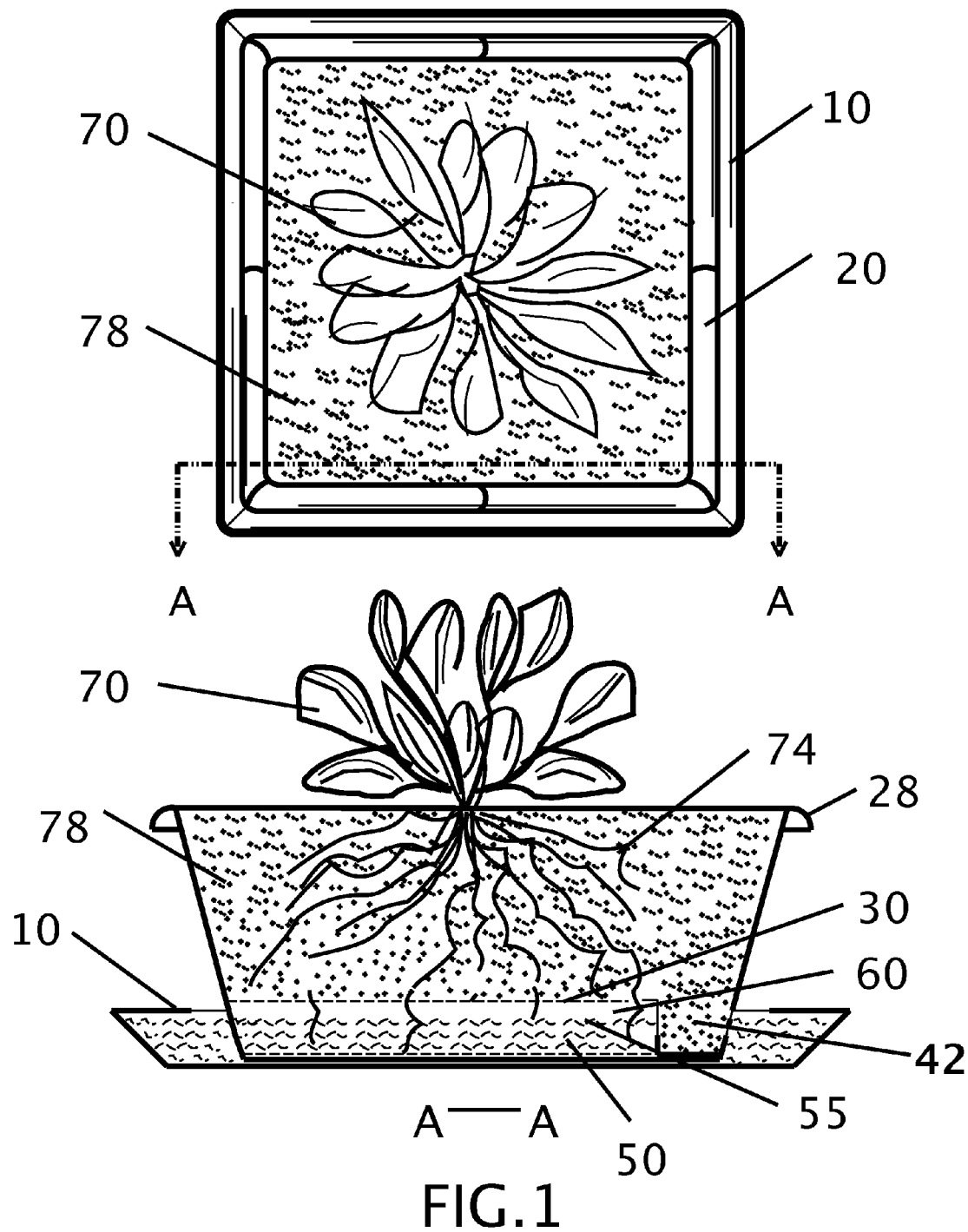
FIG. 1 is a top plan view of best mode with plant and soil or growing media installed. Top plan view defines a cross-sectional plane where the cross-sectional view of said plane is depicted below the top plan view.
Figure 2:
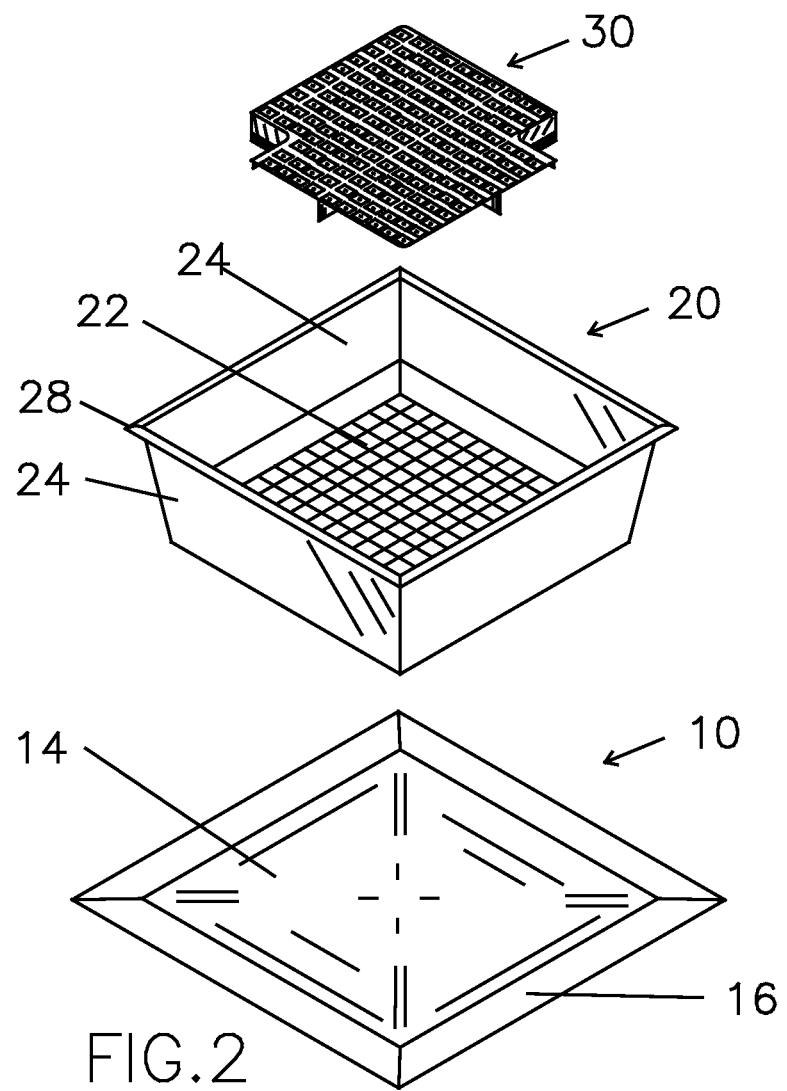
FIG. 2 is an exploded top perspective view of best mode.
Figure 2A:
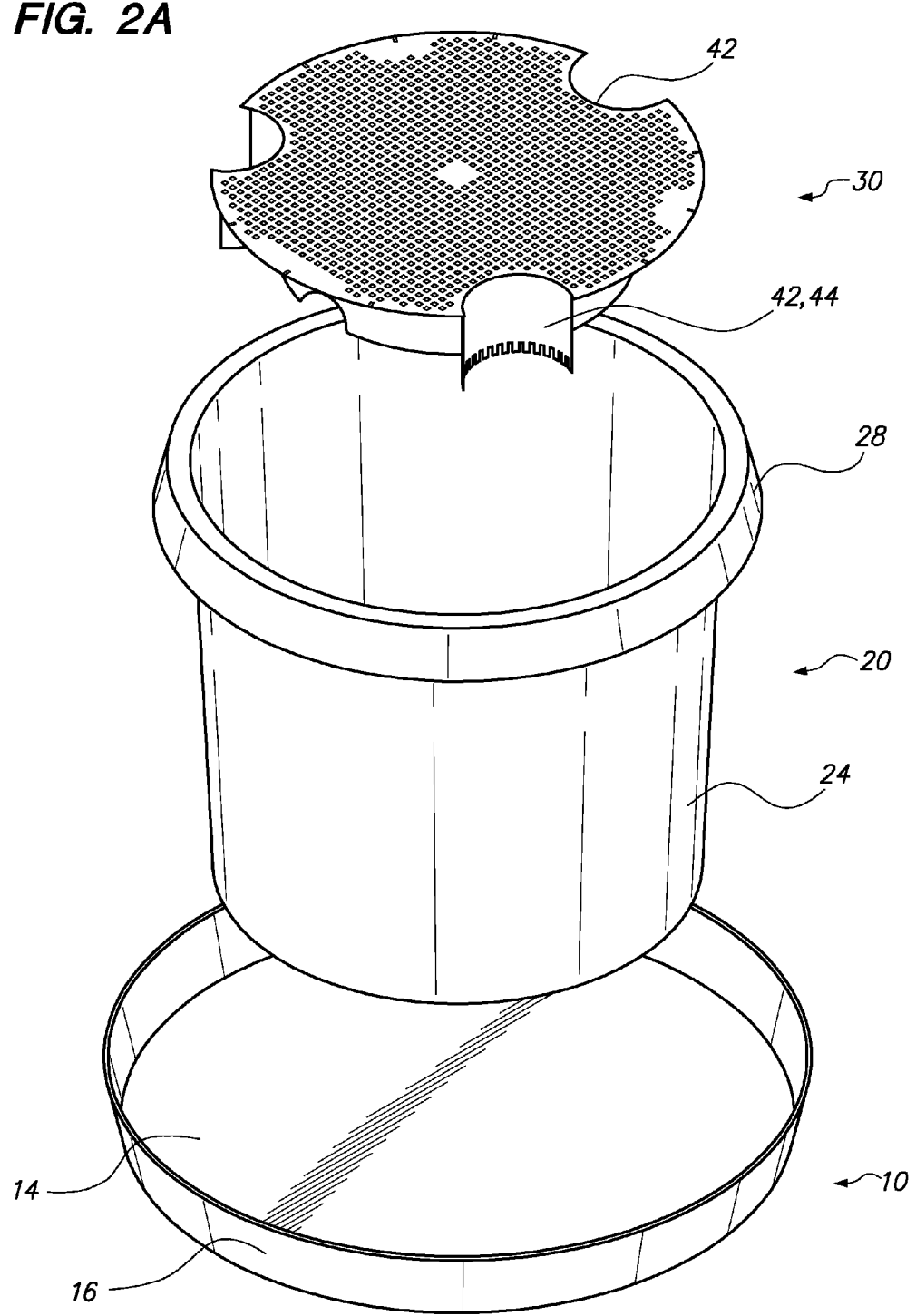
FIG. 2A is an exploded top perspective view of rounded mode.
Figure 3:
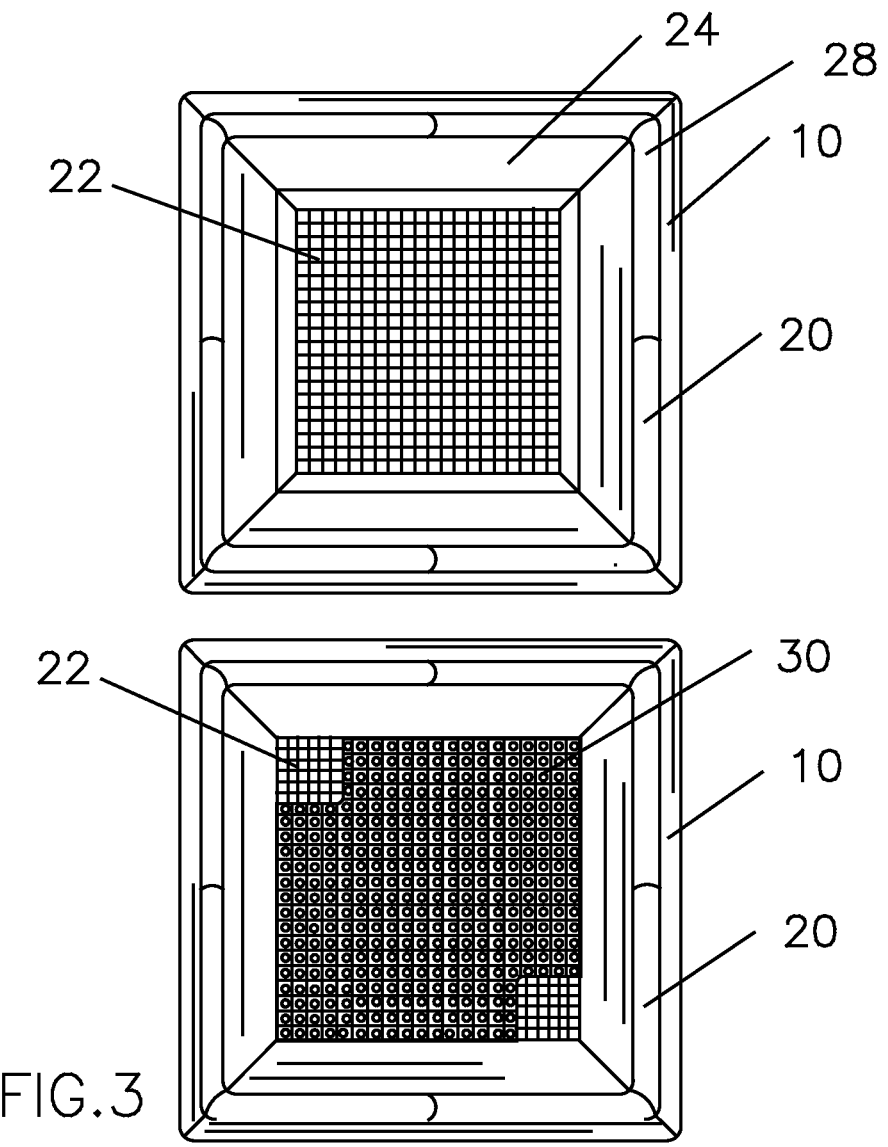
FIG. 3 is a top plan view of best mode Tray Member with Flat Member installed in it (top figure). The bottom figure is a top plan view of best mode Tray Member with Flat Member installed in it, along with Insert Member installed into Flat Member.
Figure 4:
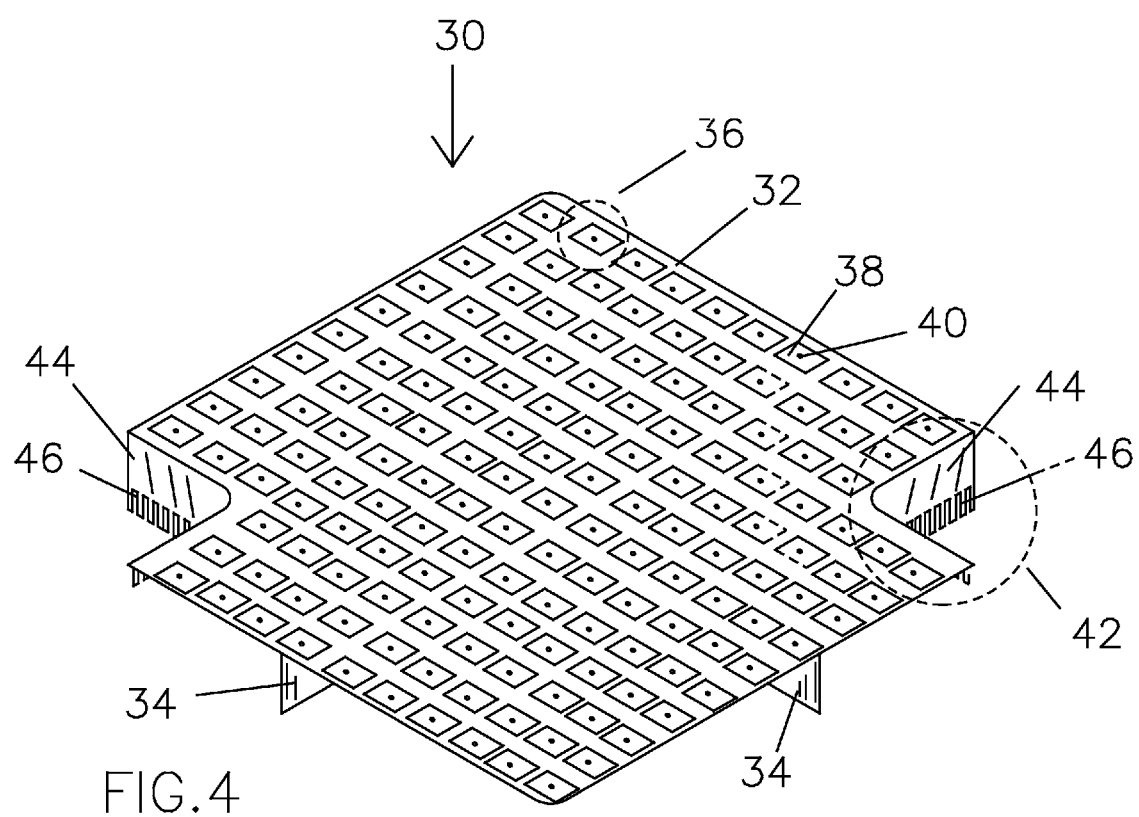
FIG. 4 is a top perspective view of best mode Insert Member.
Figure 5:
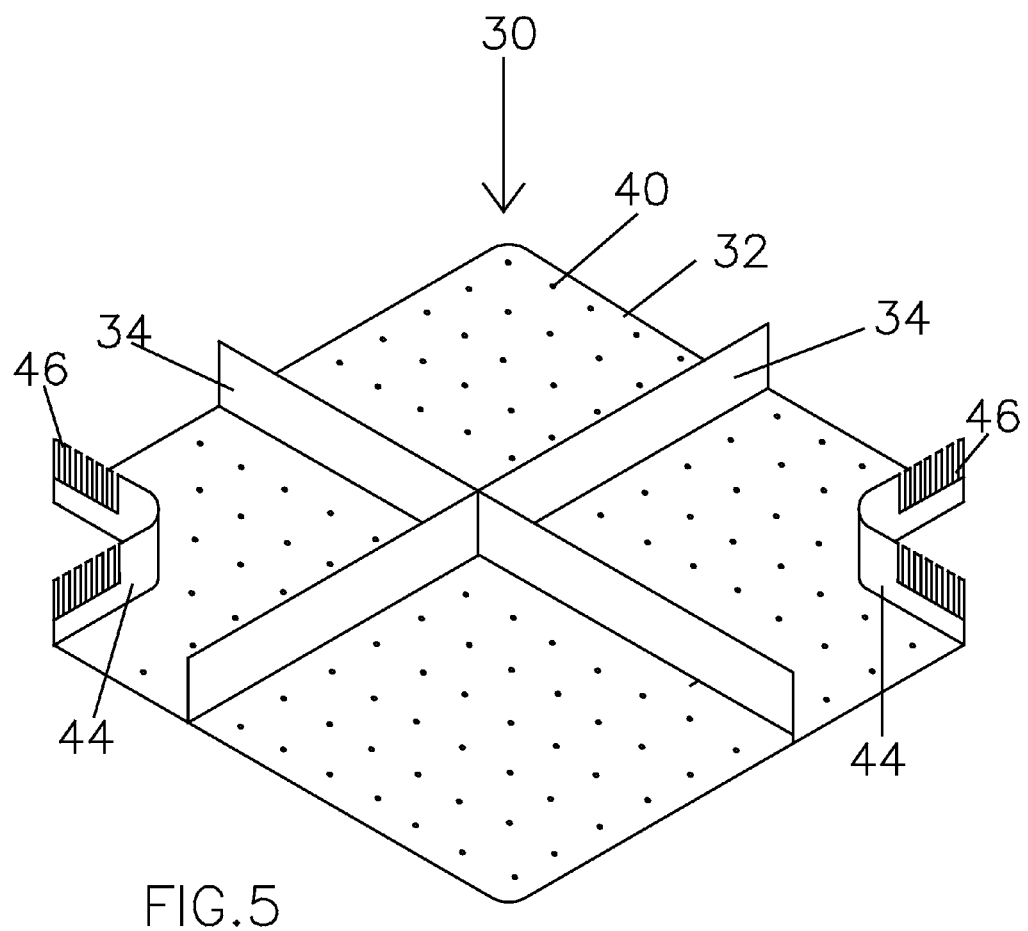
FIG. 5 is a bottom perspective view of best mode Insert Member.
Figure 6:
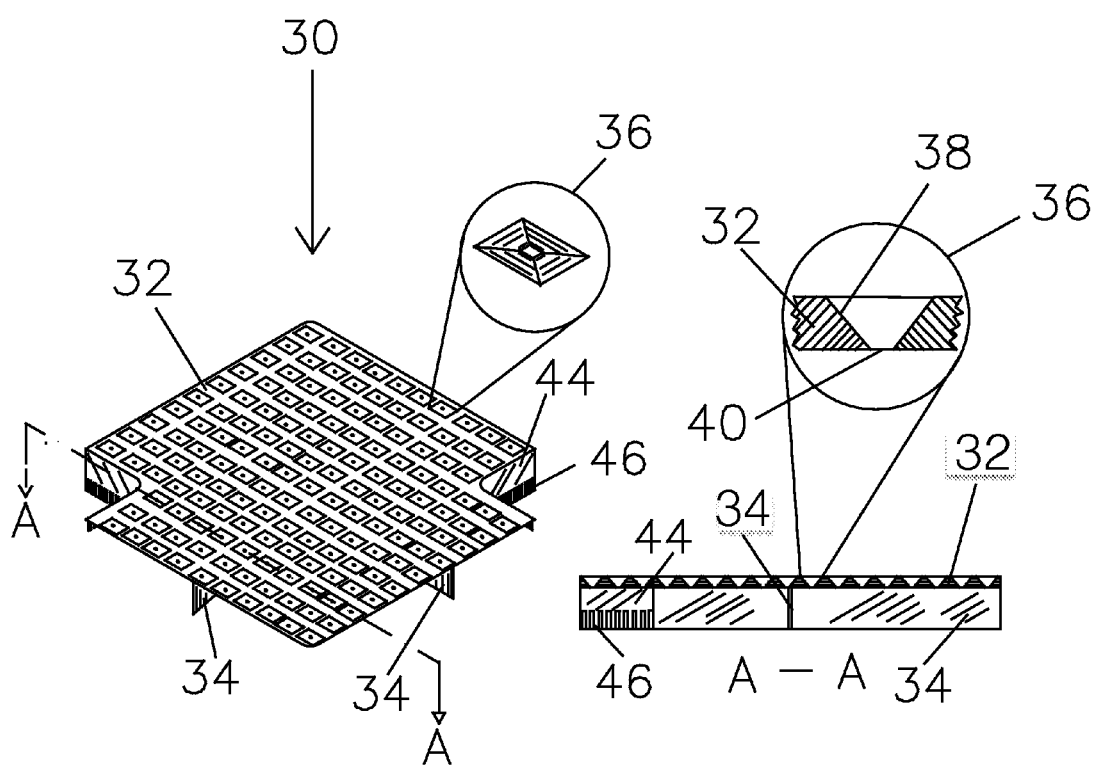
FIG. 6 is a top perspective view of best mode Insert Member defining a cross-sectional plane along with the cross-section view of said plane. Further, there is a blow-up view of a Root-Pruning Aeration Aperture located on the cross-sectional view.
Figure 7:
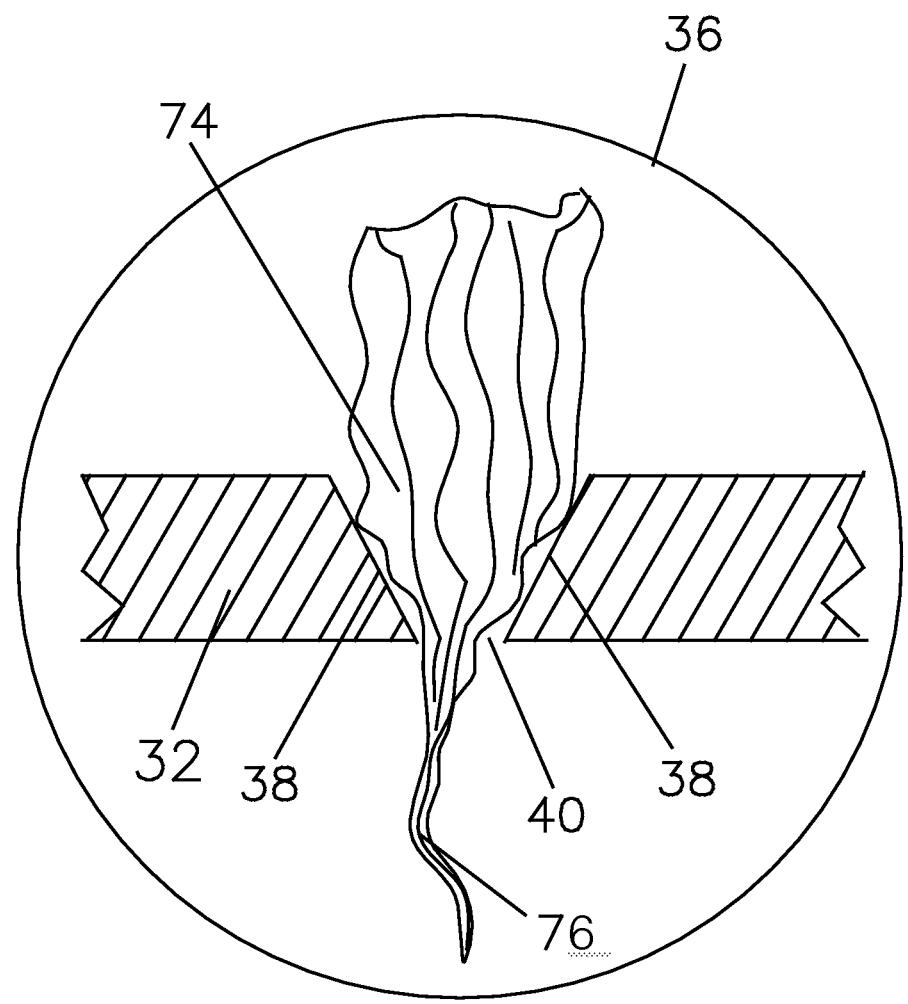
FIG. 7 is a blow-up view of a Root-Pruning Aeration Aperture with a small plant root lodged in its lower aperture opening.
Figure 7A:
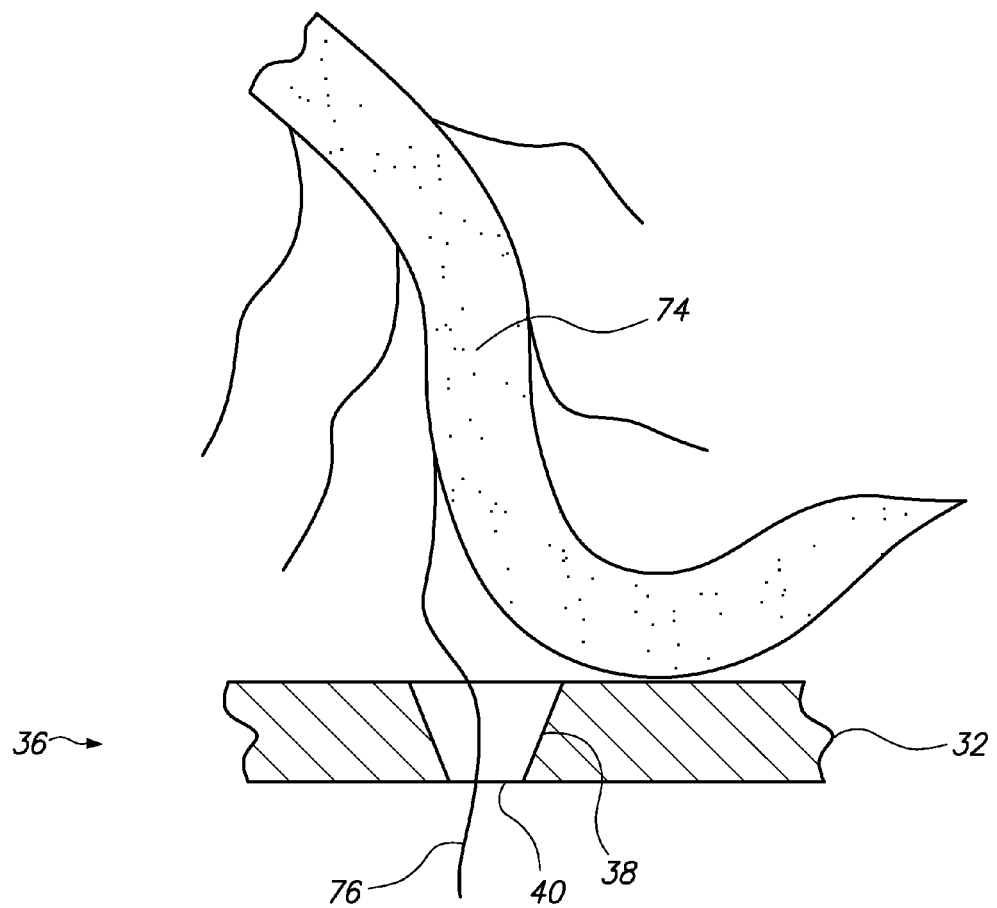
FIG. 7A is a blow-up view of a Root-Pruning Aeration Aperture with a root hair lodged in its lower aperture opening.

| Term | Definition |
| --- | --- |
| 10 | Tray Member |
| 14 | Tray Member Bottom |
| 16 | Tray member Side |
| 20 | Flat Member |
| 22 | Liquid Permeable Bottom |
| 24 | Side Member |
| 28 | Brim |
| 30 | Insert Member |
| 32 | Growing Media Support Layer |
| 34 | Support Member for Growing Media Support Layer |
| 36 | Root-Pruning Aeration Aperture |
| 38 | Aperture Funnel Member |
| 40 | Lower Aperture Opening |
| 42 | Wicking Chamber Knockout Section |
| 44 | Wicking Chamber Separation Wall |
| 46 | Wicking Chamber Soil Contact Void |
| 50 | Water Reservoir |
| 55 | Water or Nutrient Solution Level |
| 60 | Air Layer |
| 70 | Plant |
| 74 | Plant Root(s) |
| 76 | Root Hair or Very Small Root |
| 78 | Soil or Growing Media Main Chamber |

DETAILED DESCRIPTION OF THE INVENTION

Self-watering plant container comprises: a tray member 10, a flat member 20, and an insert member 30. Tray member 10, flat member 20, and insert member 30 all must have a similarly shaped footprint or similarly overall shape from plan view because these members must stack together to form the self-watering plant container. Flat member 20 is placed partially within tray member 10 and insert member 30 is placed completely within flat member 20. Typically, self-watering plant container has members 10, 20, and 30 that are all circular, oval, square, rectangular, or triangular shaped, but they could be any shape. In best mode, plant container has square-shaped members; thus, tray member 10, flat member 20, and insert member 30 all have a general square-shape where the overall length and width of these members is similar.

In best mode, members 10, 20, and 30, are each molded as one-piece units, including all sub elements within the member, so that members 10, 20, and 30 each have monolithic construction. Monolithic construction is preferred because this type of construction holds up best without deterioration at the seams with deterioration resulting from sun, water, wind, or other exposure from the elements. Plant containers must hold up to extended exposure to the elements for several years in order to be considered high quality plant containers.

Tray member 10 comprises a tray member bottom 14 and at least one tray member side 16. Tray member 10 is a container member with bottom member 14 and side members 16 so that the container is capable of holding liquid, without leaking the liquid. Tray member 10 must be capable of holding at least one gallon of water or nutrient solution when placed horizontally level. Tray member bottom 14 is a rigid non-permeable horizontal planar member used as the bottom member of tray member 10. Tray member 10 is used as a container or tray to hold water or nutrient solution for the plant to absorb into its root system. Tray member sides 16 make up the sides of this container. Tray member bottom 14 may be circular, oval, square, rectangular, triangular shaped, or other as discussed above. In the case of a circular or oval bottom member 14, there would be only one side member 16, which would be circular ring shaped or oval ring shaped, and would act as the side members for the whole container, which would be shaped like a short bucket or saucer. If tray member bottom 14 is square or rectangular shaped, there would be four tray member sides 16 required to complete the container tray member 10. If tray bottom member 14 is triangular, three tray member sides 16 are required to complete the container tray member 10, and so on. In best mode, tray member bottom 14 is a square-shaped member. Tray member sides 16 are rigid non-permeable planar members. Typically, tray member sides 16 are integral to each other and to tray member bottom 14 and tray 10 is formed as one piece. Tray member sides 16 are connected to each other and to tray member bottom 14 to form a non-permeable connection between these members. Tray member sides 16 essentially rise upwards from the edges of bottom member 14, which lies horizontally, to form a tray-shaped container 10. Taller tray member sides 16 allow container 10 to hold more water or nutrient solution. Tray member sides 16 may need to be at least two inches tall or more in order to hold the required minimum of one gallon of water or nutrient solution.

Flat member 20 comprises a water or liquid permeable bottom 22 and at least one side member 24. Flat member 20 is a container member with a water or liquid permeable bottom member 22 and side members 24 so that the container is capable of holding soil or other growing media along with a living plant with root system. Flat member 20 must be sturdy and capable of holding at least 25 pounds of wet soil and plant without breaking Liquid permeable bottom 22 is a rigid to semi-rigid liquid-permeable horizontal planar member used as the bottom member of flat member 20. Liquid permeable bottom 22 must have holes or apertures to allow liquid to freely pass through member 22, inward and outward from flat member 20. Liquid permeable bottom 22 sits in water reservoir 50 when flat 20 is placed into tray 10. The liquid that must freely pass is water or nutrient solution that makes up the pool in tray 10. Holes or apertures should be as large as possible in this regard in order to keep resistance to this water flow at a minimum. However, said holes or apertures must not be too large so as to allow soil to fall through the bottom and leak from flat member 20. In best mode, Liquid permeable bottom 22 has apertures that are about 3/16 of an inch in diameter, separated by about 5/16 of an inch center-to-center distance. Holes or apertures are spaced over the entire area of liquid permeable bottom 22, except for the edges of bottom 22 which do not have apertures. The edges of bottom member 22 need to remain strong in order to support at least 25 pounds of wet soil and plant without breaking Holes or apertures near the edges would not allow the required strength around the edges of bottom member 22.

Side members 24 make up the sides of container 20 and are non-permeable rigid planar members that are impenetrable to light. Light should not shine on plant roots 74 through side members 24. Liquid permeable bottom 22 may be circular, oval, square, rectangular, triangular shaped, or other as discussed above. In the case of a circular or oval liquid permeable bottom member 22, there would be only one side member 24, which would be circular ring shaped or oval ring shaped, and would act as the side members for the whole container, which would be shaped like a short bucket or saucer. If liquid permeable bottom 22 is square or rectangular shaped, there would be four side members 24 required to complete the container flat member 20. If liquid permeable bottom 22 is triangular, three side members 24 are required to complete the container flat member 20. In best mode, liquid permeable bottom 22 is a square-shaped member. Side members 24 are rigid non-permeable planar members. Typically, side members 24 are integral to each other and to liquid permeable bottom 22 and flat member 20 is formed as one piece. Side members 24 are connected to each other and to liquid permeable bottom 22 to form a non-permeable connection between these members. Side members 24 essentially rise upwards from the edges of liquid permeable bottom 22, which lies horizontally, to form a tray-shaped container 20. Taller side members 24 allow the flat 20 to hold more growing media and larger plants. Best mode flat member 20 has length/width of about 12-24 inches and depth of about 6-12 inches.

Flat member 20 further comprises a brim 28. Brim 28 is a lip member around the perimeter of the top edge of flat member 20. Brim 28 is a curled member extended radially outward from the upper edges of side member(s) 24. Brim 28 is connected to the upper edge of side member 24 to form a non-permeable connection to members 24 around the entire upper perimeter of flat 20. Typically, side members 24 and brim 28 are integral to each other and are formed as one piece. Brim 28 curls over and downward from upper edges of members 24 to form a lip member, with convex upper surface and concave lower surface. Brim 28 functions to provide a lifting handle for flat 20. Thus, there is a lifting handle around the entire upper perimeter of flat 20. The lifter may insert their fingers in a concave under section of brim 28 to provide a very firm handle on the flat. Brim 28 must be very sturdy and able to support at least 25 pounds of soil and plant robustly without cracking or breaking, even after years of weather exposure.

Insert member 30 is installed into the bottom of flat member 20, where it is used as a "false bottom" for the soil or growing media. Insert member 30 supports the growing media so that a water reservoir 50 may be located under growing media. This arrangement is required in order to achieve the self-watering aspect of wicking water upwards while not allowing too much absorption, which would occur if soil or growing media was placed under the water level 55 as with the typical flowerpot/saucer arrangement. Thus, an air layer 60 exists between soil or growing media and water level 55. Insert member 30 must be sturdy and able to hold at least 25 pounds of soil and plant.

Flat member 20 is paired with insert member 30 and vice versa. The dimensions of flat member 20 must be paired exactly with the dimensions of insert member 30 because the insert member must form a slip-fit within the bottom of flat member 20. The fit must be precise so that soil or growing media will not slip between the crack or seam between the outer edges of insert member 30 and inner surfaces of side members 24, where this crack or seam must remain soil-tight even when self-watering plant container is moved around aggressively with a living plant and soil inside. Additionally, insert member 30 must remain horizontally flat and level for the self-watering aspect to function properly, so insert member 30 must pair with the structure of insert member 30 and specifically that of growing media support layer 32 to render insert member 30 horizontally flat and level within the flat 20.

Insert member 30 comprises: a growing media support layer 32, at least one support member for growing media support layer 34, at least two root-pruning aeration apertures 36, and at least one wicking chamber knockout section 42. Growing media support layer 32 is a rigid to semi rigid horizontal planer member used as a false bottom to support soil or growing medium above water reservoir 50. Growing media support layer 32 covers about 70-90 percent of said liquid permeable bottom 22. The purpose is to position soil and plant above the water level 55 of water reservoir 50 so that there is an airspace layer 60 between growing media support layer 32 and water level 55. As stated above, growing media support layer 32 has overall shape that allows it to be placed inside of the bottom of flat member 20, where there is a tight slip fit between these members. In best mode, insert member 30 is square with side dimension of about 10-20 inches. Growing media support layer 32 must be sturdy enough to support at least 25 pounds of wet soil and plant without cracking or breaking and must remain so after many years after being exposed to the elements or weather. At least one support member for growing media support layer 34 functions to support a growing media support layer 32 above the water reservoir 50. At least one support member for growing media support layer 34 is a rigid vertical planer member that supports growing media support layer 32 from underneath it like a support beam or joist. At least one support member for growing media support layer 34 extends at right angle downward from the lower surface of growing media support layer 32. At least one support member for growing media support layer 34 must be tall enough to support growing media support layer 32 above water level 55, and thus member 34 must be taller than tray member sides 16, as this height represents the maximum water level 55, where reservoir 50 would then spill over sides 16. Further, it is best to have at least one inch of air layer 60 to allow for proper drying/aeration of soil or growing media, so member 34 should rise at least one inch taller than sides 16. In best mode, at least one support member for growing media support layer 34 is rectangular planar shaped position on its side with length matching the width of insert member 30 so as to run across the full width of insert member 30. Thus, the width of rectangular planar member is the height of support member 34. Typically, at least one support member for growing media support layer 34 is integral to growing media support layer 32 and insert member 30 is formed as one piece. In best mode, there are two support members for growing media support layer 34, where each crosses the center of growing media support layer 32 at right angles to each other and each runs across the entire bottom surface. Thus, support members for growing media support layer 34 provide sturdy support positioned directly under the centerlines of growing media support layer 32 in both length and width dimensions. This placement of support members 34 provides maximum support to prevent growing media support layer 34 from flexing resulting from the heavy weight of the soil and plant.

In best mode, root-pruning aeration apertures 36 are spaced evenly throughout the entire surface of growing media support layer 32. Root-pruning aeration apertures 36 must be designed so that roots may not penetrate through growing media support layer 32, where most roots attempting to grow through growing media support layer 32 are redirected to remain within the interior of flat member 20, while allowing thin root hairs or very thin roots to penetrate growing media support layer 32, through lower aperture opening 40, and into water reservoir 50, while also leaving air to permeate in and out through root-pruning aeration apertures 36. As stated above, aeration is done to promote drying of main soil chamber 78, which is required to prevent root rot disease.

This special achievement is accomplished by specially shaped root-pruning aeration apertures 36 spaced appropriately throughout growing media support layer 32. Root-pruning aeration apertures 36 are generally funnel shaped apertures, with the large opening facing upwards. Root-pruning aeration apertures 36 function to redirect larger roots upwards into soil or growing media or redirect larger roots from growing downward through growing media support layer 32. This is done to prevent roots from growing through air layer 60 and into water reservoir 50 thereby becoming too wet which could lead to root rot disease as discussed above. However, root hairs, which are thin lateral outgrowths from roots, and very small roots, are capable of being soaked in water continuously without developing a root rot condition. This is a result of their properties including the physical properties of being a singular aerated strand of small diameter stretched across an air layer 60. Singular aerated strands of small diameter are too small to wick large amounts of water across the air layer and into the main soil chamber and thus do not lead to a root-rot condition. Thus, even when their ends are kept continuously wet, root hairs and very small roots will not develop root rot if there is an air space layer separating the soaked ends and the main soil or growing media area surrounding the larger roots. However, root hairs and very small roots are still capable of continuously absorbing water and nutrients internally for the plant to use. This arrangement achieves a faster water and nutrient absorption rate by the plant without the threat of root rot. Thus, it is better for the harvest to keep root hairs and very small roots continuously wet. Root-pruning aeration apertures 36 promote this condition.

Root-pruning aeration apertures 36 comprise: a funnel member 38 and a lower aperture opening 40. Funnel member 38 is funnel shaped rigid impermeable member with hole through center, like a typical funnel. The opening on its upper end is larger than the opening on its lower end to yield the funnel shape. The hole in the lower end of this funnel shape is lower aperture opening 40. Funnel shaped opening 38 is a void in growing media support layer 32, with the top edge of the funnel shape essentially flush with the upper surface of growing media support layer 32 and lower aperture opening 40 essentially flush with the bottom surface of growing media support layer 32. Thus, lower aperture opening 40 opens into air layer 60 with water reservoir 50 below it. The funnel shape is used to redirect a larger root back upwards into soil or growing media and/or to force a root hair or very small root 76 to grow into reservoir 50. The upper opening of funnel member should be about 1.5-4 times that of lower aperture opening 40 in order to yield the proper deflection angle and pruning angle on funnel member 38 to sprout root hair or very small root 76 leading to water reservoir 50. Lower aperture opening may not have diameter larger than that of the root hair or very small root of the particular plant 70. This will vary with the particular plant type. Best mode root-pruning aeration apertures 36 were designed for tomato plants and similarly sized plants where root-pruning aeration apertures 36 have an upper opening of about ¼-⅛ inches in inner diameter and a lower aperture opening 40 of about 0.050-0.100 inches in inner diameter. Root-pruning aeration apertures 36 may be circular-shaped, square-shaped, rectangular-shaped, triangular-shaped, or have other shape. In best mode, apertures are squared-shaped because the square aperture allow for air permeation through its four corners when there is a root hair or very small root growing through it. Roots and hairs have circular cross sections so they do not fill the corners of a square-shaped aperture. Thus, in effect, in best mode, root-pruning aeration apertures 36 are "square-shaped funnels", with square-shaped horizontal cross-sections, rather than the usual round-shaped funnel.

In best mode, root pruning aeration apertures 36 encompass about half of the area of growing media support layer 32 and are evenly spread throughout. Thus, half of the area of growing media support layer 32 is plain impermeable member as described above while the other half consists of root pruning apertures 36 as described above. This results in a growing media support layer 32 with upper surface that has apertures 36 positioned in an even checkered pattern throughout. In this way, there is a 50 percent likelihood that a root as it grows downward will strike standard impermeable area of layer 32 or strike the upper portion of root pruning aeration aperture 36. Those roots that strike impermeable areas are redirected laterally across growing media support layer 32 or back upwards thereby keeping said root inside of soil area or growing media. Those roots that strike the upper portion of root pruning aeration apertures 36 will be forced the make a u-turn, as they grow down one side of the funnel shape to be stopped by lower aperture opening because it is too small for most roots to pass and then back upwards into main chamber 78, and/or sprout root hairs 76 that will be forced to grow into water reservoir 50. This is desirable to maximize plant absorption of water and nutrients. Alternately, the larger root may become wedged into the bottom of funnel member 36, in which case the physical constraints of funnel member 36 with very small hole 40 at the bottom prevent any further growth of the root except for that of a very small root diameter root to pass through lower aperture opening 40. In this way, the larger root becomes pruned into just a small root extension. This small root is then permitted to grow into reservoir 50 without causing a root rot condition in main chamber 78.

Wicking chamber knockout section 42 is a portion of growing media support layer 32 that is removed or "knocked-out" to allow for the would-be soil or growing medium resting on this section to essentially fall down below growing media support layer 32 and into reservoir 50. The soil or growing medium in the wicking chamber knockout section 42 is horizontally supported by tray member bottom 14. Thus, the lower portion of the soil or growing medium located in wicking chamber knock-out section 42 continuously lies in water or growing medium 50 pooled in tray member 10. This allows this portion of the soil or growing medium to act as a wicking agent to absorb liquid, which is then absorbed by the soil or growing medium above that, and so on, to create a general upward flow of liquid into the main soil or growing medium chamber 78. This flow results from capillary action in the roots and in the soil or growing media located in wicking chamber knockout section 42. Wicking chamber knockout section 42 must be sized in relation to the total area of growing media support layer 32 so that wicking chamber knockout section 42 wicks up enough water or nutrient solution to allow continuous absorption of such by the plant 70 through the roots in the main soil chamber 78 without wicking up too much water or nutrient solution so as to create conditions in the main chamber 78 that are damp enough to cause root rot. Typically, in order to accomplish this, there should be about a 1:7 ratio between footprint area of the main soil chamber and the footprint area of wicking chamber knockout section.

Wicking chamber knockout section 42 comprises wicking chamber separation walls 44. A wicking chamber separation wall 44 is an impermeable rigid planar member extending vertically downward from growing media support layer 32 to rest on the upper surface of tray bottom member 14. Wicking chamber separation walls 44 surround wicking chamber knockout section 42 to prevent soil or growing medium from spilling into water reservoir 50. Water reservoir 50 is located in the bottom of tray member 10 as stated above. Thus, with insert member 30 installed properly into the bottom flat member 20, the lower layer of the soil or growing medium in wicking chamber knockout section 42 sits in water reservoir 50. Wicking chamber separation wall 44 prevents this soil from spilling into reservoir 50 as a result of the pressure from the soil above it. Wicking chamber separation walls 44 also support growing media support layer 32 like a beam or joist. Walls 44 along with support member 34 must hold growing media support layer 32 horizontally level above water level 55, thus these members must have the same height and must rise higher than tray member sides 16 to accomplish this. Typically, growing media support layer 32 and separation walls 44 are integral to each other and insert member 30 is formed as one piece. Thus, there is an impermeable connection between growing media support layer 32 and wall members 44.

Wicking chamber separation walls 44 further comprise wicking chamber soil contact voids 46. Wicking chamber soil contact voids 46 are small voids in the lower ends of wicking chamber separation walls 44 that function to allow water or nutrient solution from reservoir 50 to flow in and out of wicking chamber knockout section 42 as required to keep capillary flow of water absorption into the main soil chamber. Wicking chamber soil contact voids must be large enough to allow enough water to freely flow into the knockout chamber in order to keep up with plant absorption requirements, however, contact voids must not be too large so as to let soil seep into reservoir 50. If soil seeps into the reservoir, there is a danger of root rot. In best mode, wicking chamber soil contact voids are oblong-shaped or rectangular-shaped, standing upright, sized at about $3/16 \times 1/2$ inches. This size wicking chamber soil contact void may be placed along all lower edges of wicking chamber separation walls 44 on a ½ inch center-to-center spacing without leading to any appreciable soil seepage into the reservoir.

In best mode, there are two square-shaped wicking chambers knockout sections 42 per insert 30, each knockout section 42 located at a diagonal corner of square insert member 20. By positioning wicking chamber knockout sections in the corners, less separation walls 44 are required. This is because we can use the corners of tray member 10 to act as two sides of the wicking chamber knockout sections 42. With knockout sections located in the corners, as depicted in the drawings, knockout sections 42 may be defined on two sides by wicking chamber separation walls 44 and on the other two sides by side members 24. Thus, in best mode there are four separation walls 44, two for each knockout section 42.

Tray member 10 should be kept with water or nutrient solution pooled in it at all times. Depending on a variety of factors, including the type of plant, whether the plant is placed in the sun or shade, weather conditions, etc., this may require that the plant grow refill the water reservoir once or twice a day. In other cases, the plant grower may only need to refill the reservoir once a week or so. No matter what the refilling frequency, it is important to keep the reservoir 50 full of water or nutrient solution.

With self-water plant container, the plant grower may check the water level 55 in the reservoir 50 by simply walking past it or visually inspecting it from a distance. Further, if the plant grower notices that the reservoir is low, he may simply refill it from the side of the plant. This is because tray member 10 has a much upper wider opening than that flat member 20, so tray member 10 extends outward beyond flat member 20, to provide enough room to visually inspect water level 55 in tray 10 and enough room to easily refill reservoir 50 with a simple watering container, bucket, hose, or other method without dismantling anything in self-watering pant container or even touching anything on it.

What is claimed is:

1. A self-watering plant container comprising:

a tray member, comprising a tray member bottom and at least one tray member side, wherein said tray member bottom is a rigid horizontal impermeable planar member with a top surface and a bottom surface, said at least one tray member side is rigid impermeable planar, circular ring, or oval ring shaped, extending upwards from the entire perimeter of said tray member bottom with an upper edge and a lower edge, to form an impermeable container with an open top that is capable of holding at least one gallon of fluid;

a flat member, comprising a liquid permeable bottom and a at least one side member, wherein said liquid permeable bottom is a rigid horizontal permeable planar member with a top surface and a bottom surface, said at least one side member is rigid impermeable planar, circular ring, or oval ring shaped extending upwards from the entire perimeter of said liquid permeable bottom with an upper edge and a lower edge, to form a said container with an open top and a liquid permeable bottom that is capable of holding at least 25 pounds of wet soil or growing media when horizontal while allowing any excess liquid that might otherwise pool in the wet soil or growing media to drain through said liquid permeable bottom; and an insert member, comprising a growing media support layer with a top surface and a bottom surface, at least one support member for growing media support layer, at least two root-pruning aeration apertures, and at least one wicking chamber knockout section, wherein said flat member fits within said open top of said tray member to rest horizontally on said top surface of said tray member bottom, so that said liquid permeable bottom and said lower edge of said at least one side member are located entirely within said tray member and below said upper edge of said at least one tray member side, said at least one side member has a larger height dimension than that of said at least one tray member side and thus rises higher than said at least one tray member side, said insert member is a rigid horizontal planar member, capable of supporting at least 25 pounds of wet soil or growing media, that rests horizontally on said top surface of said liquid permeable bottom to cover 70-90 percent of said top surface of said liquid permeable bottom, while leaving the rest of this surface uncovered, wherein uncovered surfaces are said at least one wicking chamber knockout section, said insert member fits entirely within said open top of said flat member, so that said top surface of said growing media support layer lies below said upper edge of said at least one side member, said growing media support layer is a top surface of said insert member, said growing media support layer is impermeable except for where said at least two root-pruning apertures are located therein which are permeable, said at least one support member for growing media support layer is a rigid vertical planar member extending vertically downward from said bottom surface of said growing media support layer to support said growing media support layer from underneath to help support said growing media support layer horizontally above said upper edge of said at least one tray member side, said at least two root-pruning aeration apertures are each generally funnel-shaped apertures in said growing media support layer with an upper opening flush with said top surface of said growing media support layer and a lower opening flush with said bottom surface of said growing media support layer wherein said generally funnel-shaped apertures function: a) to redirect plant root growth upwards to allow a root hair or lateral outgrowth from the root to grow downwards through said lower opening or (b) to prune a plant root into a small root with an equivalent diameter to a root hair to allow said small root to grow downwards through said lower opening, thereby preventing all plant root growth, except for root hairs and small roots with equivalent diameters to root hairs, from growing downwards through said lower opening, said upper opening has a width of 1.5-4 times that of said lower opening, thereby giving said at least two root-pruning aeration apertures their general funnel shape, said lower opening has a width of 0.050-0.300 inches and is sized to block all root growth from passing through except for root hairs and small roots with equivalent diameters to root hairs, said at least one wicking chamber knockout sections is a portion of said growing media support layer that is removed so as to not cover said top surface of said liquid permeable bottom, to allow for the soil or growing medium to fall down to rest on said top surface of said liquid permeable bottom, below said growing media support layer, said at least one wicking chamber knockout section further comprises at least one wicking chamber separation wall which is an impermeable rigid planar member extending vertically downward from said bottom surface of said growing media support layer to support said growing media support layer from underneath to help support said growing media support layer horizontally above said upper edge of said at least one tray member side, and said at least one wicking chamber separation wall further comprises at least two wicking chamber soil contact voids which are voids in said impermeable rigid planar member of said at least one wicking chamber separation wall to allow for the passage of liquid there through.

* * * * *